United States Patent
Bruck et al.

(10) Patent No.: US 6,237,022 B1
(45) Date of Patent: May 22, 2001

(54) SYSTEM AND METHOD FOR DISTRIBUTING PREFERENCED DATA OVER A COMMUNICATIONS NETWORK

(75) Inventors: Timo Bruck, Mountain View, CA (US); Alan Cohn, New York, NY (US); Wei Huang; Eric M. Tucker, both of Mountain View, CA (US); Samuel Thomas Scott, III, Los Gatos; Bruce A. Leak, Los Altos, both of CA (US)

(73) Assignee: WebTV Networks, Inc., Mountain View, CA (US)

(*) Notice: Subject to any disclaimer, the term of this patent is extended or adjusted under 35 U.S.C. 154(b) by 0 days.

(21) Appl. No.: 09/268,239

(22) Filed: Mar. 15, 1999

(51) Int. Cl.[7] .......................... G06F 15/16; G06F 15/177
(52) U.S. Cl. ..................... 709/201; 709/200; 709/203; 709/217; 709/219
(58) Field of Search ................................ 709/217, 218, 709/219, 227, 231, 200, 203, 201, 223, 224; 705/14, 27; 345/27

(56) References Cited

U.S. PATENT DOCUMENTS

| | | | | |
|---|---|---|---|---|
| 5,727,129 | * | 3/1998 | Barrett et al. | 709/217 |
| 5,913,040 | * | 6/1999 | Rakavy et al. | 709/217 |
| 5,996,007 | * | 11/1999 | Klug et al. | 709/218 |
| 6,011,537 | * | 1/2000 | Slotznick et al. | 345/329 |
| 6,047,327 | * | 4/2000 | Tso et al. | 709/217 |
| 6,067,570 | * | 5/2000 | Kreynin et al. | 709/227 |

* cited by examiner

Primary Examiner—Mark H. Rinehart
Assistant Examiner—Marc D. Thompson
(74) Attorney, Agent, or Firm—Workman, Nydegger & Seeley

(57) ABSTRACT

A system and method for distributing and presenting preferenced data from a host server to a browsing device through a communications network. The method involves identifying a user preference, providing at least one data feed containing information related to the user preference, selecting preferenced data from the data feed corresponding to the user preference, preloading the preferenced data from the host server to the browsing device, and presenting the preferenced data through the browsing device.

14 Claims, 9 Drawing Sheets

SYSTEM AND METHOD FOR DISTRIBUTING PREFERENCED DATA OVER A COMMUNICATIONS NETWORK

TECHNICAL FIELD

The present invention relates generally to distributing data to users of a communications network, and more particularly, to distributing preferenced data from a host server to a browsing device via a communications network such as the Internet.

BACKGROUND OF THE INVENTION

In modern society, communications networks such as the Internet enable vast numbers of persons to communicate a virtually limitless variety of information across great distances. The development of the World Wide Web has enabled persons with relatively little technical training to find and display information in a multimedia format using a browsing device, such as a personal computer or television set-top box (STB), running a browser program, such as MICROSOFT® Internet Explorer or Netscape Navigator. As a result, the number of sites and the number of users on the Internet have concomitantly experienced meteoric growth.

For aid in accessing the Internet, many users subscribe to Internet access services, such as the WEBTV® Internet access network. (WEBTV is a registered trademark of WebTV Networks, Inc. of Mountain View, Calif.) The WEBTV Internet access network includes a large number of browsing devices, referred to as client terminals, and at least one host server. The client terminals are connected to the Internet via conventional modem pools, either by Integrated Services Digital Network (ISDN) connection, a telephone line, or another data link, and can directly access web pages established by Internet publishers. The host server communicates with the client terminals to provide a convenient standardized interface for accessing the Internet. The host server also offers supplemental services, such as email, news reports, television program guides, and enhanced access to certain web pages for subscribers of the service.

As the audience of users of these Internet access services has grown, so too has the potential of such services to deliver advertising content through the Internet. Unfortunately, while a healthy variety of advertising methods exists for publishers of Internet sites, vendors of Internet access services face a lack of methods by which they may effectively deliver advertising content to their subscribers.

The publisher of an Internet site is able to advertise by several presently known methods. For example, a publisher may include advertisements in graphical banners or audio jingles on an Internet site. A publisher also may include a text or graphical link to another web page containing information about an advertiser or advertised product. It is also known to embed hidden advertisement links within a standard hypertext link to a destination Internet site. When a user selects the link, intending to go to the destination page, the user also unwittingly triggers the embedded link, and is briefly shown an advertisement before the browsing device continues to download the destination page. This type of interstitial advertising requires the user to wait while the browsing device downloads and displays the advertisement. Interstitial advertising methods are also known in which advertising information embedded in a web page or in the home page of the browser, or cached in the client browsing device itself, is presented in response to selection of a hypertext link on a web page (see Judson, U.S. Pat. No. 5,572,643, the disclosure of which is herein incorporated by reference). These advertising methods also delay the user during download of the advertising information.

Publishers of Internet sites typically advertise using "pull technology". Pull technology is so-named because a user must request information, or pull it, from a server before the information will be sent to the user's browsing device. For each of the above-mentioned forms of advertising, the user must direct the browsing device to download the information.

Despite the availability of advertising methods for publishers, Internet access services face several problems when advertising. First, pull technology is not an effective means of distributing advertising for Internet access services. Often an Internet access service merely offers the user a dial-up connection to the Internet. In such a case, the Internet access service is largely invisible to the user. The user typically uses a modem to dial a phone number and establish a connection to the Internet, and uses an off-the-shelf browser program to access web pages through the Internet. Pull technology cannot be used to distribute advertising to a user of such an Internet access service because the user is not accessing any web pages published by the Internet access service.

Other Internet access services, such as the WEBTV Internet access network, offer Internet access via a proprietary interface allowing access to subscriber services, such as a web directory and search engine, as well as to the Internet. Pull technology may be used to advertise directly to users of such an Internet access service, but only when the users are accessing the web pages published by the Internet access service. When users simply use the Internet access service to view external web pages on the Internet, not published by the Internet access provider, pull technology is ineffective to distribute advertising.

When a user's browsing device is pointed elsewhere, Internet access services must resort to "push technology" for advertising. According to push technology, a server pushes information to a browsing device without request from the user, or based on a predetermined request from the user. Current push technology causes the user two types of delay. First, the user experiences delay as the browsing device takes time to download the pushed information. Second, the user is delayed when interrupted by an unrequested display of pushed information. Such delay may be annoying to the user, and may decrease the effectiveness of the advertising due to the intrusive nature of the advertisement.

Current browsing devices also cause the user delay. For example, the browsing device may experience delay when connecting to external devices and remote computers via a communications network. Particularly when using a relatively slow connection to the Internet and downloading large amounts of data, a user may have to wait a significant amount of time for a web page to download. This type of inherent delay in using the browsing device further aggravates the user and decreases the enjoyment of using a browsing device to navigate a communications network.

In addition, advertising methods that present advertising too frequently, or too repetitively, often have a negative effect on the user. For example, a user presented with an advertisement at every transition between web pages may become disinterested in the transitions, and ignore the advertising. Further, where push technology is used to deliver advertising that is irrelevant to the user, the user may become conditioned to ignore the advertising.

It would be desirable to provide a method for distributing data wherein data is downloaded from a host server across a communications network and displayed by a browsing device without causing delay to the user of the browsing device. It would also be desirable to utilize inherent delays in browsing device operation, such as download waiting periods between web pages, to display advertising. Finally, during the inherent delays, it would be desirable to periodically display data, such as news, sports, weather, or other information relating to a topic selected by a user, in combination with or in the stead of advertising data to provide interesting and various content to the user.

SUMMARY OF THE INVENTION

A method and a system are provided for delivering data, including advertising data and preferenced data, from a host server to a browsing device though a communications network. Advertising data is data presented to a user to advertise goods or services, while preferenced data is data presented to a user in response to a user preference. The method typically includes identifying a user preference and providing at least one data feed containing information related to the user preference. The method may further encompass selecting preferenced data from the data feed corresponding to the user preference and preloading the preferenced data from the host server to the browsing device. Finally, according to the method, the preferenced data may be presented data to the user through the browsing device.

The system typically includes a host server and a browsing device connected by a communications network, such as the Internet. The system also typically includes a data feed accessible by the host server through a communications network. The data feed contains information related to a topic such as news, sports, or weather. The host server is configured to receive a user preference, select preferenced data from the data feed corresponding to the user preference, and preload the preferenced data to the browsing device through the communications network. The browsing device is configured to present the preferenced data to the user.

DETAILED DESCRIPTION OF THE INVENTION

FIGS. 1–9 and the following discussion are intended to provide a brief, general description of a suitable networked computing environment in which the invention may be implemented. Those skilled in the art will appreciate that the invention may be practiced with other networked computer devices, including hand-held devices, multiprocessor systems, minicomputers, mainframe computers, and the like. The invention may also be practiced in distributed computing environments where tasks are performed by remote processing devices that are linked through a communications network.

Figure 1:
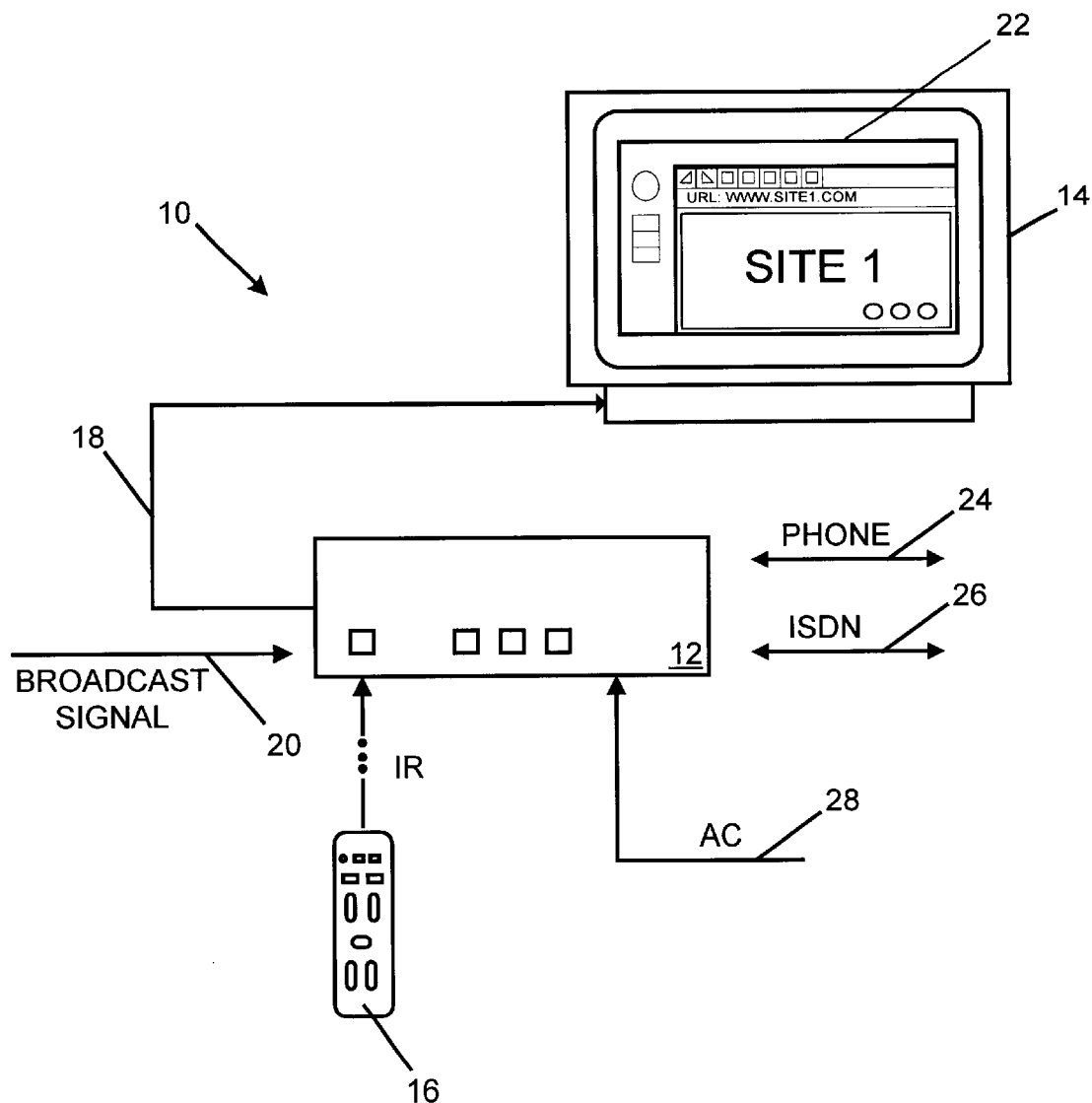
FIG. 1 is a somewhat schematic view of a browsing device in the form of a set-top box configured for use in accordance with the present invention.

FIG. 1 depicts a browsing device 10 in the form of a WEBTV client terminal. As indicated, the client terminal includes an electronics unit 12, a television 14, and a remote control 16. Electronics unit 12 typically is referred to as a set-top box (STB), because of its usual placement on top of television 14. Set-top box 12, however, may be built into television 14, forming an integral unit. The client terminal uses television 14 as a display device for displaying both video data and a graphical user interface, and as a loudspeaker device for emitting audio data. The set-top box is coupled to the television by a communications link 18. The link is an RF (radio frequency), S-video, composite video, or other equivalent form of communications link.

The set-top box includes hardware and/or software for receiving and decoding a broadcast video signal 20, such as an NTSC, PAL, SECAM or other TV system video signal, and providing video data to the television via link 20. Set-top box 12 also includes a browser program, which may be implemented in hardware and/or software, to cause a graphical user interface 22 to be displayed on television 14. The browser program enables a user to access various WEBTV network services, browse the World Wide Web, send email, or otherwise access the Internet.

Client terminal 10 may include both a standard modem and an ISDN modem, such that the communication link between set-top box 12 and the Internet can be either a telephone (POTS) connection 24 or an ISDN connection 26. The set-top box receives power through a power line 28.

Remote control 16 is operated by the user to control television viewing, and to control the client terminal while browsing the World Wide Web, sending email, or performing other Internet-related functions. The set-top box receives commands from remote control 16 via an infrared (IR) communication link. Alternatively, the link between the remote control and the set-top box may be an RF communication link or any equivalent communication link (e.g., wires, etc.).

Figure 2:
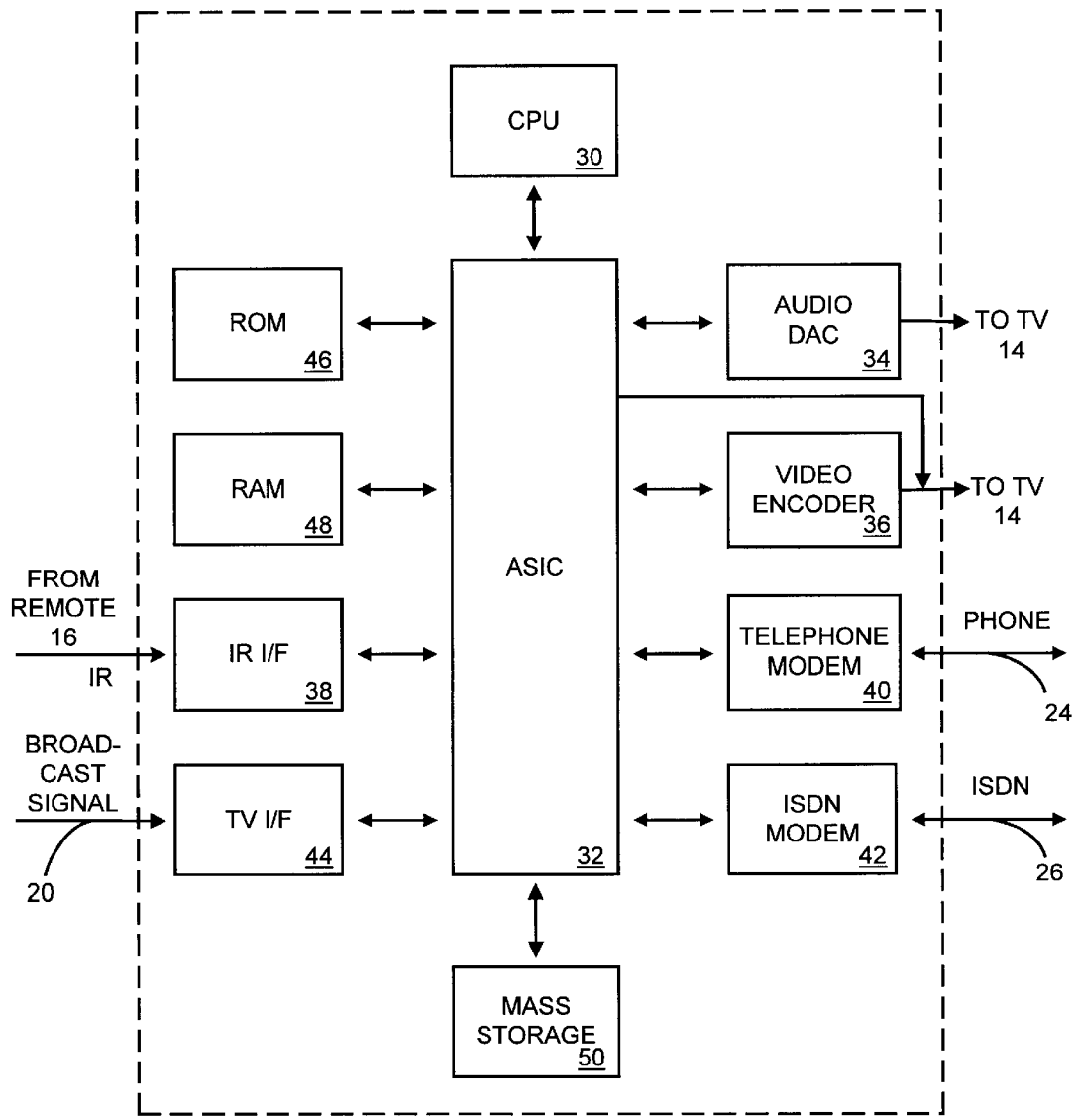
FIG. 2 is a schematic view illustrating the architecture of the browsing device of FIG. 1.

FIG. 2 is a block diagram illustrating internal features of set-top box 12. In this illustration, operation of the client terminal is controlled by a processing unit, such as central processing unit (CPU) 30, which is coupled to an Application-Specific Integrated Circuit (ASIC) 32. The CPU executes software designed to implement various features of the present invention. ASIC 32 contains circuitry which may be used to implement these features. ASIC 32 is coupled to an audio digital-to-analog converter (DAC) 34 which provides audio output to television 14. In addition, ASIC 32 is coupled to a video encoder 36 which provides video output to television 14. An IR interface 38 detects IR signals transmitted by remote control 16 and, in response, provides corresponding electrical signals to ASIC 32. A standard telephone modem 40 and an ISDN modem 42 are coupled to ASIC 32 to provide for connection(s) to the Internet. Those skilled in the art will appreciate that the set-top box also may include a cable television or radio frequency modem (not shown).

A TV interface 44 is coupled to ASIC 32 to receive broadcast video signals, such as an NTSC video signal, and to provide corresponding electrical signals to ASIC 32. This allows video data carried in broadcast video signal 20 to be presented to the viewer on television 14. More specifically, TV interface 44 is configured to digitize the incoming video signal, which is stored in RAM 48, so that ASIC 32 and CPU 30 can process the video signal before displaying it on the television. This configuration enables the set-top box to generate shared screen viewing where the video signal only occupies a portion of the screen. The remaining screen area then can be used to display various user interface controls or data, such as video programming information.

Also coupled to ASIC 32 is memory, including random access memory (RAM) 48 and read-only memory (ROM) 46, which provides for storage of program code for implementing application software to be executed by the set-top box. Note that ROM 46 may be a programmable ROM (PROM), or any form of erasable PROM (EPROM), or flash memory. A mass storage device 50 optionally may be provided and coupled to ASIC 42. The mass storage device may be used to input software or data to the client terminal or to store downloaded software or data. Mass storage device 50 can be any suitable device for storing machine-executable instructions, such as a magnetic drive, optical drive, and the like.

Figure 3:
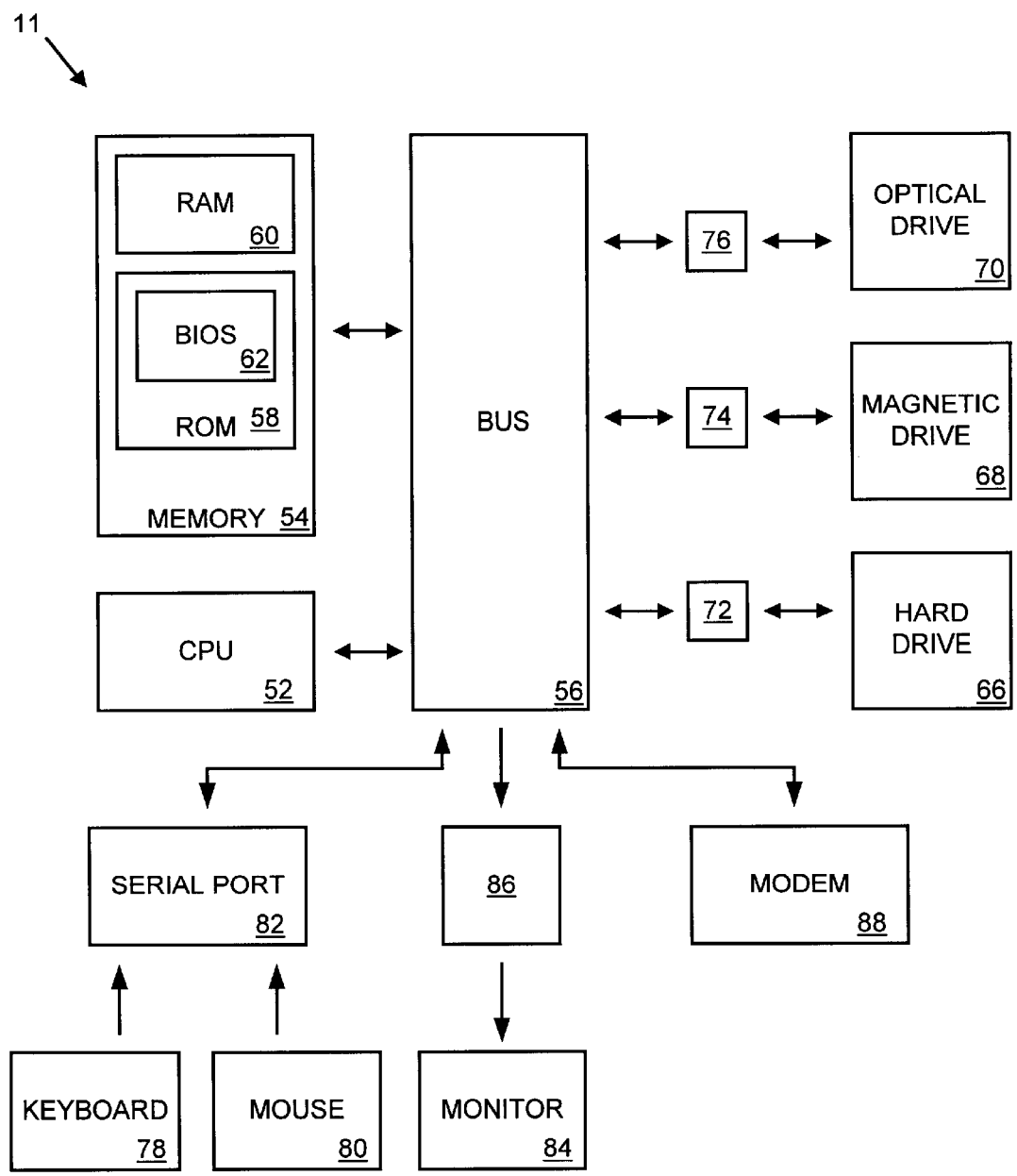
FIG. 3 is a schematic view of a browsing device in the form of a personal computer configured for use as part of the present invention.

FIG. 3 depicts an alternate browsing device in the form of a conventional personal computer 11, including a central processing unit (CPU) 52, a memory 54, and a bus 56 that couples various components (including the memory) to the CPU. The bus 56 may be any of several types of bus structures, including a memory bus or memory controller, a peripheral bus, or a local bus using any of a variety of bus architectures. The memory includes read only memory (ROM) 58 and random access memory (RAM) 60. A basic input/output system 62 (BIOS), containing basic routines which help to transfer information between elements within the personal computer (such as during start-up), is stored in ROM 58.

The personal computer further includes a hard disk drive 66 for reading from and writing to a hard disk, a magnetic disk drive 68 for reading from or writing to a removable magnetic disk, and an optical disk drive 70 for reading from or writing to a removable optical disk such as a CD ROM or other optical media. Hard disk drive 66, magnetic disk drive 68, and optical disk drive 70 are connected to bus 56 by a hard disk drive interface 72, a magnetic disk drive interface 74, and an optical drive interface 76, respectively. The drives and their associated computer-readable media provide non-volatile storage of computer-readable instructions, data structures, program modules and other data for the personal computer.

Although the exemplary environment shown in FIG. 3 employs a hard disk, a removable magnetic disk, and a removable optical disk, it should be appreciated by those skilled in the art that other types of computer readable media which can store data which is accessible by a computer (e.g. magnetic cassettes, flash memory cards, digital video disks, Bernoulli cartridges, random access memories (RAMs), read only memories (ROMs), etc.) also may be used.

A number of program modules may be stored on the hard disk, magnetic disk, optical disk, ROM 58, or RAM 60, including an operating system, one or more application programs, other program modules, and program data. A user may enter commands and information into the personal computer 11 through input devices such as a keyboard 78 and/or a pointing device (mouse) 80. Other input devices (not shown) may include a microphone, joystick, game pad, satellite dish, scanner, or the like. These and other input devices often are connected to the processing unit 52 through a serial port interface 82 which is coupled to the bus. However, the input devices may be connected by other interfaces, such as a parallel port, game port or a universal serial bus (USB).

A monitor 84 or other type of display device is also connected to the bus 56 via an interface, such as a video adapter 86. In addition to the monitor, personal computers typically include other peripheral output devices (not shown) such as speakers and printers. Finally, personal computer 11 includes a browser program, which may be implemented in hardware and/or software, to cause a graphical user interface to be displayed on monitor 84. The user employs the graphical user interface to browse the World Wide Web, send email, and otherwise access the Internet. The personal computer also typically includes a modem 88, such as an ISDN modem or telephone line modem, connected to the serial bus for communication with remote computers through a communications network.

Figure 4:
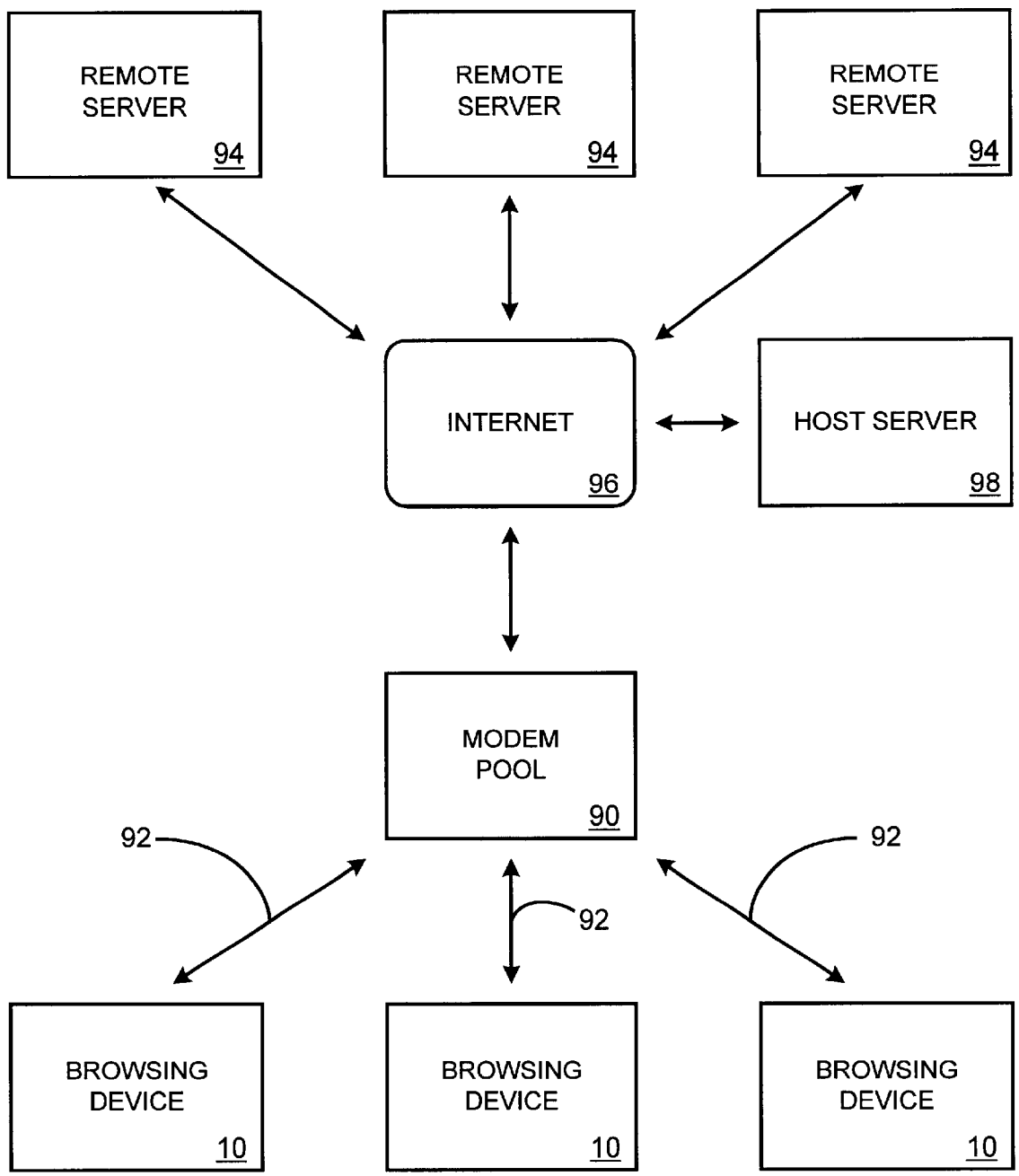
FIG. 4 is a schematic view of the structure of a communications network for use by browsing devices as shown in FIGS. 1 and 3.

FIG. 4 illustrates a basic configuration of a networked computing environment in which a browsing device, such as a client terminal or personal computer, typically operates. A number of browsing devices 10 are coupled to a modem pool 90 via bi-directional data connections 92, which may be a telephone connection, ISDN connection, or any other similar type of connection, such as cable and satellite forward channels. Modem pool 90 typically is coupled through a router, such as that conventionally known in the art, to a number of remote servers 94 via a conventional communications network 96, such as the Internet. The communications network also includes a host server 98, which specifically supports and communicates with browsing devices 10. The browsing devices each have a connection to host server 98 through modem pool 90 and the Internet. Note that modem pool 90 is a conventional modem pool, such as is found today throughout the world providing access to the Internet and private networks.

The present invention preferably is implemented on a communications network navigable by hypertext links, such as the World Wide Web. The World Wide Web encompasses a vast collection of web pages residing as data files on remote servers connected to the Internet. Each web page is downloadable and viewable by a browsing device, and often contains hypertext links, which, if selected, cause the browsing device to point to, or download and display, a new web page.

Within the World Wide Web, a collection of related web pages forms a web site. Individuals or organizations that provide content to the World Wide Web are known as publishers. A single publisher on the Internet may establish a single page, an entire web site, or multiple web sites. Web pages are stored as data files on remote servers, and transmitted to browsing devices upon request from each browsing device. Each remote server has a unique numeric Internet protocol (IP) address which marks its location on the Internet, and most have an alphanumeric domain name, associated with the IP address, providing an alternative, easy-to-remember address at which the remote server may be contacted. Each data file which contains web page data has a unique file path to indicate its location within the remote server.

To download and present data from a remote server over the communications network, browsing device 10 contacts a remote server 94 through communications network 96 using a network address such as a universal resource locator (URL). The URL, it will be appreciated, contains the protocol by which the data is to be transferred, as well as the domain name or IP address at which the remote server is located, and the file path of the specific file to be transferred. The remote server then transmits the requested data to the browser program, which in turn displays the data according to predefined conventions.

Data files containing web pages typically are transmitted using the HyperText Transfer Protocol (HTTP), and encoded using the HyperText Markup Language (HTML). The HTML language provides a standard for interpretation of text data, formatting instructions, and other behavioral attributes of a web page, including links to other web pages or resource files containing image, video, and audio data.

Figure 5:
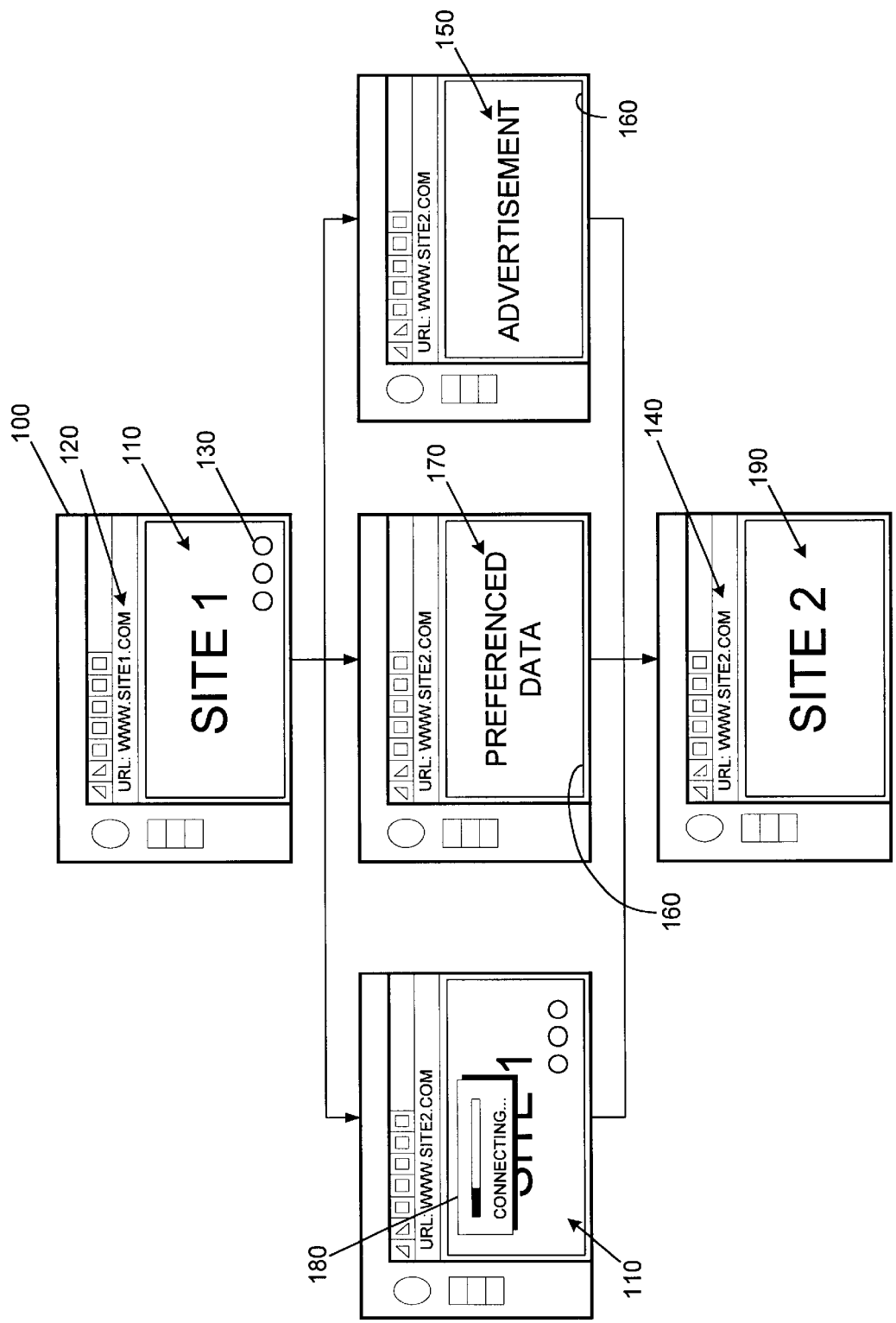
FIG. 5 is a schematic view of the transitions available to a user when switching between web pages.

In the above-described environments, the present invention may be practiced to display a variety of transitions between web pages while the browsing device is transitioning from presenting information from a current web page at a first address on the communications network to presenting information from a destination web page at a second address on the communications network, without causing the user delay during download or presentation of the information. As shown in FIG. 5, the graphical user interface 100 displays a current web page 110 located at a current URL 120. The browsing device receives a user command to download a destination web page, for example, when a user selects a hypertext link 130 or inputs a destination URL 140. Upon receiving such a command, the browsing device may display an advertisement 150 within a transition page 160 while the browsing device is transitioning from displaying the current web page to displaying the destination web page.

Figure 6:
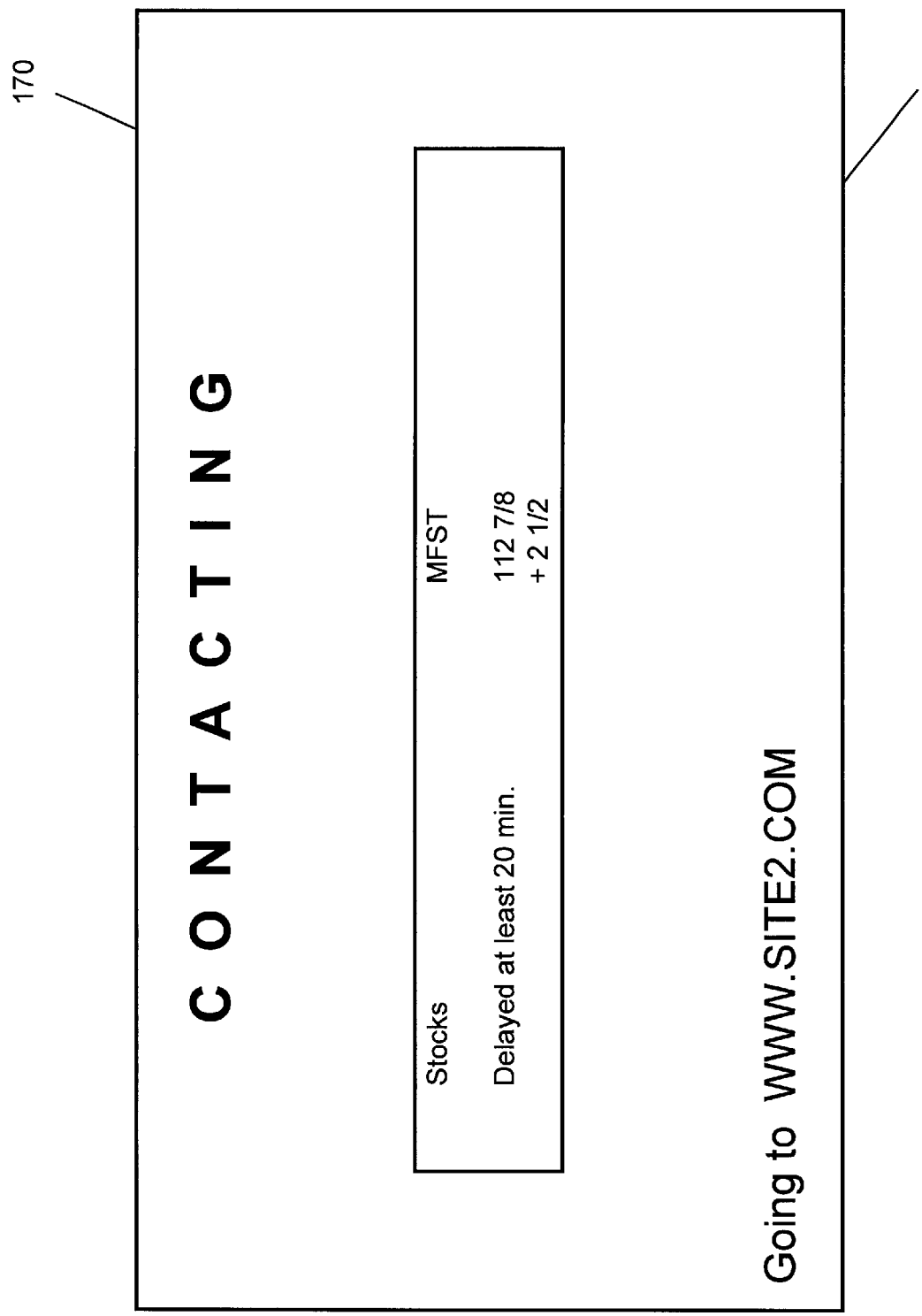
FIG. 6 is a detailed view of preferenced data displayed on a browsing device.

The browsing device also may display, within transition page 160, preferenced data 170 such as information on news, sports, weather, or other topics in which the user has previously expressed an interest. Typically, the browsing device periodically alternates between displaying transition pages containing preferenced data and transition pages containing advertising data to provide the user an interesting variety of transitions when browsing the Internet. FIG. 6 is a detailed view of one possible example of preferenced data 170 displayed within transition page 160.

Returning to FIG. 5, it will be noted that the browsing device may also trigger the display of a progress bar 180 over the current web page 110 while waiting for the destination web page to download. The progress bar may also be displayed over the transition page. After completion of the download, the browsing device displays destination web page 190, located at destination URL 140. According to the present invention, the destination web page is displayed as soon as the browsing device completes downloading the page, without delay to the user.

Figure 7:
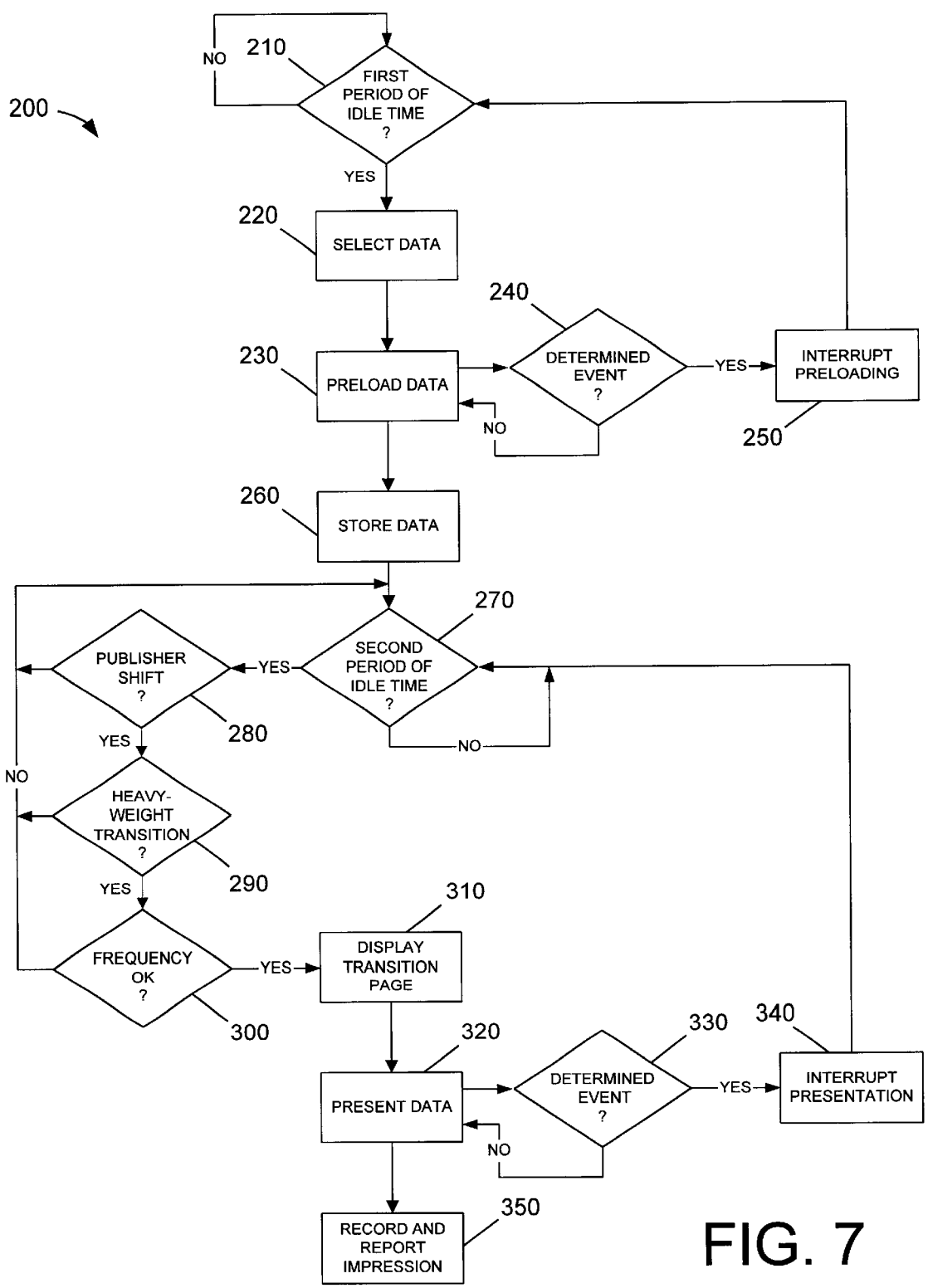
FIG. 7 is a flowchart illustrating a method for distributing data through a communications network.

To display the variety of transitions shown in FIG. 5, FIG. 7 illustrates a method 200 for preloading and presenting data such as advertising data and preferenced data during periods when browsing device 10 would otherwise experience idle time, which method may be practiced as follows. As shown in FIG. 7 at 210, the browsing device detects a first period of idle time in browsing device operation. This first period of idle time may be a period of temporary inactivity in browsing device operation, such as a period of network communications inactivity, a connect waiting period during which the browsing device is attempting to connect to a remote server through the communications network, or a stalled download period during which the browsing device is connected to, but not receiving information from, a remote server. A period of network communications inactivity occurs when the browsing device, or alternatively the browser program, is not engaged in any communication over the communications network, or is engaged in some minimal amount of communication so small that additional communications activity would not slow the browsing device or delay the user. The browser may establish contact with the host server through the communications network upon detecting the first period of idle time. Alternatively, the browsing device and host server may maintain constant contact.

As shown at 220, either after or prior to detecting the first period of idle time, a data selection program module at the host server selects data, such as advertising data or preferenced data, to download to the browsing device from the host server. While the data selection program typically resides at the host server, those skilled in the art will appreciate that it could alternatively reside on any device, such as the browsing device or a different server, connected to the communications network, and communicate selected data to the host server over the communications network.

The data selection program examines outstanding orders from advertisers, and selects data containing an advertisement, a group of advertisements, preferenced data, or other data, to preload into the memory of the browsing device over the communications network upon detection of the first period of idle time. Internet advertising typically is sold by a unit of presentation time known as an impression. Advertisers may purchase a number of impressions for a particular advertisement to be presented within a given time period. For example, an advertiser may purchase 6000 impressions of an advertisement to be presented to users in July. When selecting advertising data, the data selection program uses designated criteria to balance outstanding orders for impressions of advertisements and choose the most appropriate advertisement for presentation. When selecting preferenced data, the data selection program operates according to principles illustrated in FIG. 9 and described hereinafter. For alternative methods of selection of data that also may be suitable, see the copending U.S. Patent application entitled "System for Targeting Information to Specific Users on a Computer Network" filed Sep. 8, 1998, by inventors John Adelus, Dean Blackketter, Alan Cohn, and Thomas Scott, the disclosure of which is herein incorporated by reference.

As indicated at 230, the data is preloaded from the host server to the memory of the browsing device over the communications network. Preloading ensures that the data resides at the browsing device ahead of the time it will be displayed in order to eliminate delays associated with the display of the data. At step 240, the browsing device attempts to detect a determined browsing device event during preloading, which event indicates that the preloading process should be terminated. The determined browsing device event, for example, may be an initiation of other network communications activity by the browser program and/or browsing device, such as downloading a new web page. Alternatively, the determined browsing device event may be a user interaction with the graphical user interface of the browser program that eliminates the need to preload data for display. An example of such a user interaction may be terminating the connection to the host server or switching from browsing to some other activity. If a determined browsing device event is detected, the browsing device will interrupt the preloading of data to resume or restart at a later time, as shown at step 250.

After establishing contact and preloading, the data is then stored, at step 260, in the browsing device. The data may be stored in memory such as RAM, a mass storage device such as a hard drive, or other memory device.

To avoid unnecessary downloading of data, browsing device 10 may communicate to the data selection program the identity of data which the browsing device has currently cached in memory and/or on a mass storage device. The data selection program typically does not instruct the host server to download data already stored in the browsing device. Alternatively, the data selection program itself has the capability to store in memory the identity of data that has been preloaded to a given browsing device, and refrain from unnecessarily downloading the same data twice.

As shown at 270, at some point after the data is preloaded and stored, either during the same session of use or at some later time, the browsing device detects a second period of idle time in browsing device operation. This second period of idle time may occur at various points of inactivity in the graphical user interface of the browsing device. The second period of idle time, for example, may be a download waiting period during which the browsing device has commenced, but has not completed, downloading information from a remote server on the communications network. The download waiting period typically begins when the user sends out a request for information from the browsing device, and ends when all of the requested information is downloaded and formatted for display on the browsing device. Alternatively, the second period of idle time may be a connect waiting period during which the browsing device attempts to, but is temporarily unable to, connect with a remote computer on the network. Data is only presented during time in which the browsing device would otherwise be idle. Therefore, user operation of the browsing device is not delayed or encumbered.

To control the flow of data, the browsing device can independently evaluate three conditions before proceeding to present the data to the user. First, as shown at 280, when the user inputs a destination URL into the GUI of the browsing device, the browsing device detects whether a publisher shift has occurred. Alternatively stated, the browsing device detects whether the destination URL is an address to a web page published by a different publisher than the publisher of the currently viewed URL. Publisher shifts may be detected by comparing the domain names of a current URL and a destination URL for commonalities typically associated with a common publisher, such as identical top and mid-level or identical country and mid-level domains within each domain name. For a detailed example of a publisher shift detection method, see the copending U.S. Patent Application entitled "System And Method For Controlling Delivery Of Content Over A Communications Network" filed Sep. 8, 1998 by Timo Bruck and Alan Cohn, the disclosure of which is herein incorporated by reference. Data typically will be presented only if a publisher shift has occurred.

Second, if a publisher shift has occurred, the browsing device determines the "weight" of the transition between URLs, as shown at step 290. A transition designated as "heavy" is eligible for a display of data. A transition designated as "light" is ineligible. Typically, certain publisher shift transitions, and all non-publisher shift transitions, are predetermined to be light, such that no data will be displayed at these transitions. All other publisher shift transitions are heavy, and eligible for presentation of data.

Third, as shown at step 300, the frequency of data presentation according to the present invention may be throttled by communicating a frequency value from the host server to the browsing device, and determining whether a minimum period of time corresponding to the frequency value has elapsed since a previous presentation of data. If the minimum period of time has not yet elapsed, the data will not be presented. Once the minimum period of time has elapsed, the browsing device will allow the presentation of data, and thereafter, will start the time period anew to measure the next interval between data presentations.

Once the browsing device determines that data will be presented, the browsing device displays a transition page at step 310, which provides the format for the display of the data, much like a template is used in other contexts to provide a basic form that can be filled in with various data. The transition page typically is encoded in HTML format and saved in a mass storage device of the browsing device. Upon command from the host server the browsing device can download a new transition page with a new format from the host server, or from some other remote server connected to the communications network. A new transition page may be downloaded multiple times during a single use session of the browsing device by a user, such that the format for display of the data changes during the session. Alternatively, the transition page is a default transition page hard-coded into the browser program in the browsing device. The transition page may appear to be opaque, such that no other web page can be seen through the transition page. Alternatively, the transition page may appear partially translucent, such that either the currently viewed page or the destination page is visible through part of the transition page. The transition page may be formatted to contain data that is text data, graphical data, audio data, and/or video data. After displaying the transition page, the browsing device commences to display the preloaded data according to the format prescribed by the transition page, as shown at step 320.

Once the data is displayed, the browsing device, at step 330, attempts to detect a determined browsing device event that will be used to terminate the presentation of the data, such as user interaction with the graphical user interface of the browsing device or completion of a download of a web page. Where the second period of idle time is a connect waiting period, the determined browsing device event may be a successful connection to a remote server.

Typically, the determined browsing device events detected at 330 are independent from determined browsing device events detected at 240. Determined browsing device events detected at 240 for interrupting preloading typically are events that initiate network communications activity, thereby eliminating the ability to preload "invisibly" and necessitating the interruption to avoid delay to the user. However, determined browsing device events detected at 330 for interrupting presentation of data typically are events that signal that the browsing device is ready to display a web page. Completion of a download of a web page is an example of a determined browsing device event at 330.

When the browsing device detects the determined browsing device event, the browsing device interrupts the display of the transition page and data, as shown at step 340. Thereafter, the browsing device displays the web page the browsing device was preparing to display, or waiting to connect to, at the commencement of the second period of idle time.

Where the data contains multiple data presentations, a first data presentation may be immediately followed by a second data presentation, provided download of the destination web page has not yet been completed. Alternatively, the browsing device may wait until detection of a third period of idle time to present the second data presentation. The browsing device also may resume presentation of a data presentation that has been interrupted by the determined browsing device event, upon detection of a third period of idle time by the browsing device.

Preferably, the browsing device records the length of presentation time of the data, as shown at step 350. Once the data has been presented for a predetermined amount of time, the browsing device may report to the host server that a completed impression of the data has been achieved. Alternatively, the browsing device may report the actual length of the presentation time of the data to the host server. The host server may reprogram the browsing device through the communications network to adjust the predetermined amount of time required for an impression.

The browsing device may record an impression even where a single presentation of the data is interrupted before the impression time has been fully achieved. This is accomplished by adding multiple periods where given data is displayed until enough time has been accumulated to satisfy the predetermined amount of time required for an impression. The host server also can instruct the browsing device to report completion of an impression to the host server only if the data is displayed in a single presentation for the predetermined amount of time without interruption. The browsing device typically records the length of time the data is presented in discrete time intervals, such as seconds. The browsing device may record the length of time the data is presented in real time, including fractions of the time interval.

Figure 8:
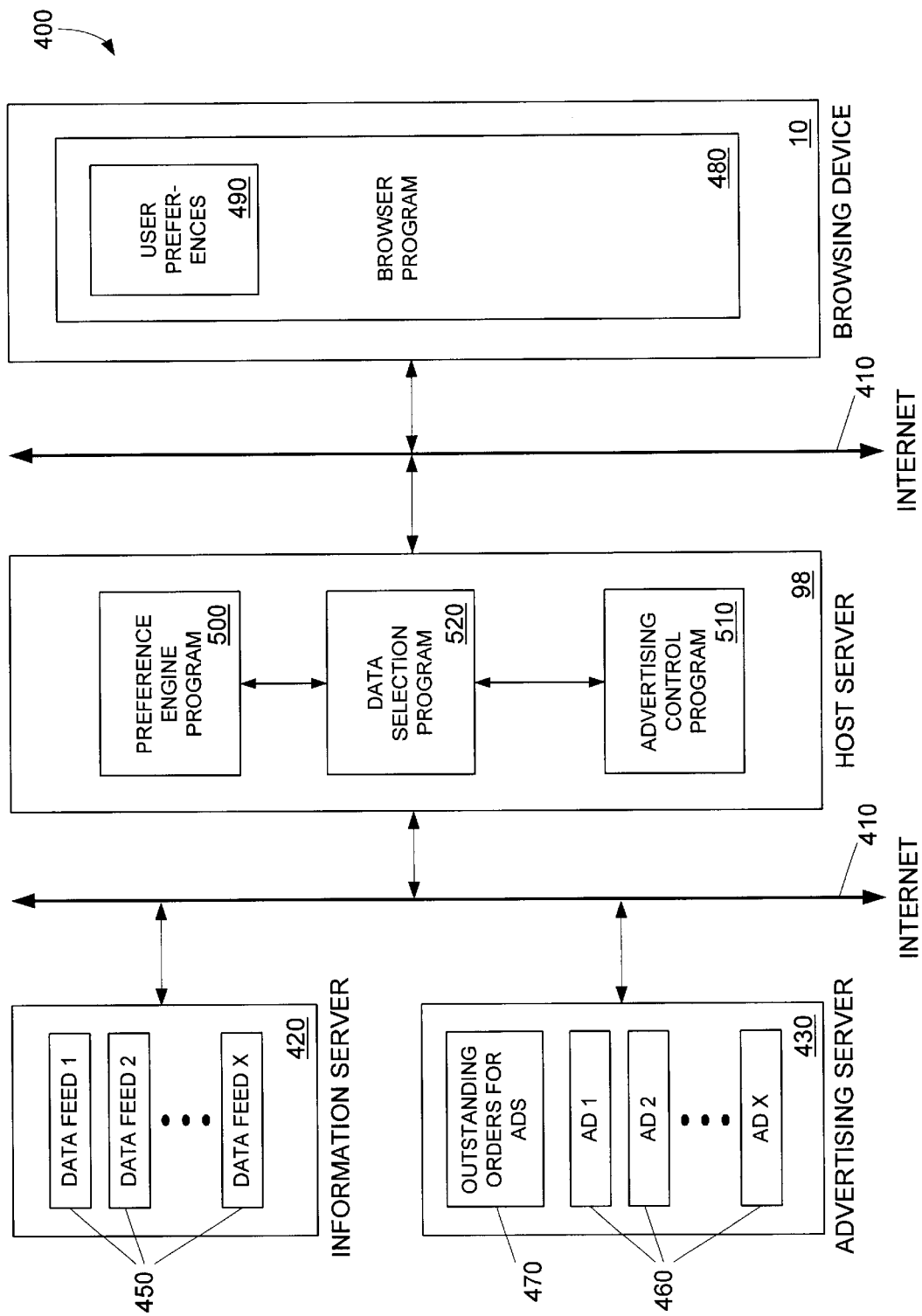
FIG. 8 is a schematic view of the structure of a networked computer environment according to the present invention.

As discussed above and shown in FIG. 5, a variety of types of data may be displayed on the browsing device during a transition between web pages. In FIG. 8, hardware and software of a system 400 for selecting and distributing different types of data, including advertising data and preferenced data, are shown. Browsing device 10 is linked via a communications network such as the Internet 410 to remote servers and to host server 98. Host server 98 in turn is linked to each of information server 420 and advertising server 430 via a communications network such as the Internet 410. Stored on the information server are data feeds 450 with timely information relating to a number of topics, such as news, sports, and weather. Data on the data feeds typically is encoded with a time stamp to indicate the time of expiration of the data, the time stamp being used for determining the age of the data. Stored on the advertising server, are advertisements 460, and information on outstanding orders 470 for the advertisements.

Browsing device 10 executes browser program 480 to download and display web pages from remote servers, and to request data from host server 98 for display during idle time. Browser program 480 also is configured to store user preferences 490 and to transfer the user preferences to host server 98.

The host server executes a preference engine program 500 for receiving the user preferences from the browsing device and matching those user preferences to data from data feeds 450 on information server 420. The host server also executes an advertising control program 510 for determining the need, based on outstanding orders 470, to display advertising data, such as advertisement 460. Finally, the host server may execute a data selection program 520 for selecting, from between the matched data feed data and the advertising data, which data to preload to browsing device 10. The host server also may preload a set of advertisements to the browsing device along with targeting and impression information for the advertisements, and a data selection program at the browsing device may select from among the set of advertisements which advertisement to display.

Figure 9:
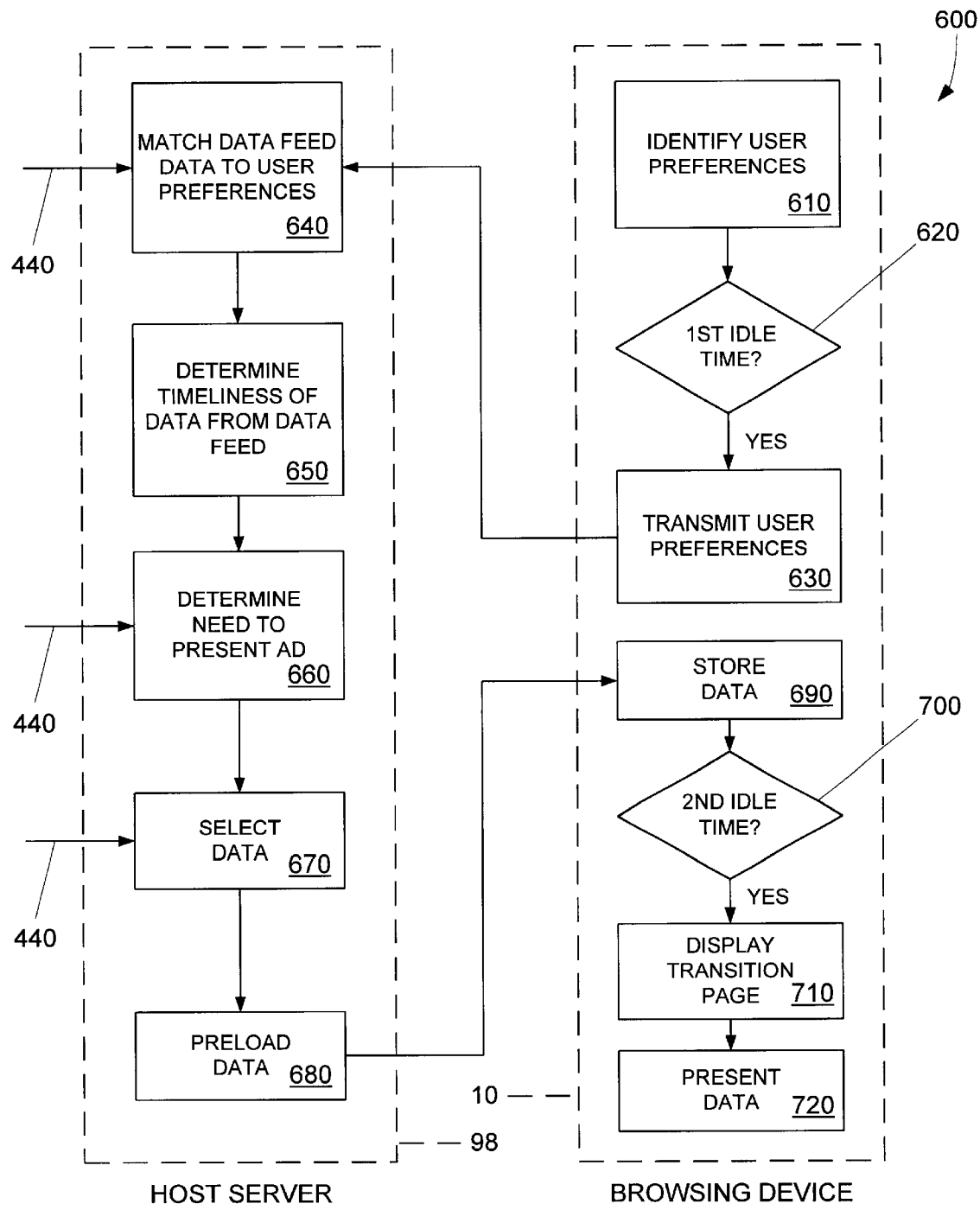
FIG. 9 is a flowchart illustrating a method for distributing preferenced data and advertising data through a communications network.

Turning now to FIG. 9, a method 600 in accordance with the present invention for preloading and displaying a variety of advertising data and preferenced data, such as customized information on news, sports, and weather, is practiced as follows. Browsing device 10 first identifies user preferences on a set of topics, as shown in FIG. 9 at 610. Typically, the browsing device identifies the user preferences by downloading a web page from the host server containing questions, receiving responses from the user, and then transmitting the user's responses back to the host server. The browsing device may query the user by presenting questions accompanied by a predetermined menu of answers, such as are available from a pull down menu. Alternatively, the user may input textual responses to a series of questions into the browsing device. The browsing device may also identify user preferences using menus hard-coded into the browser program.

Identification of user preferences need not occur at the browsing device. For example, the host server may identify user preferences by reading user responses sent to the host server in a manner other than by communications network, such as occurs when the user fills out and mails in a post card containing user preferences to the Internet access service that operates the host server.

Some time after the user preferences are identified by the browsing device, the browsing device detects a first period of idle time, shown at 620, the method of detecting the first period of idle time described heretofore. Typically, upon detection of the first period of idle time, the browsing device transmits the user preferences to the host server through the communications network, as shown at 630. Alternatively, the user preferences may be transmitted to, and stored at, the host server at an earlier time.

After the user preferences are transmitted to the host server, the preference engine program, at step 640, matches the user preferences with appropriate data from the data feeds shown in FIG. 8. The data feeds are provided to the host server through a communications network such as the Internet 410. Typically, data is matched by choosing the latest information from a data feed on a topic that the user has preferenced. Alternatively, the preference engine program may match only information from a data feed when that information has a presence or absence of certain keywords the user has indicated. Because the data is selected based on user preferences, this matched data from the data feeds is also referred to as preferenced data.

At step 650, the preference engine program determines the timeliness of the preferenced data. The preference engine program typically accomplishes this by comparing the time stamp encoded in the preferenced data against the current time. At step 660, the advertising control program at the host server determines the need to present advertising data, preferably based on the quantity and time constraints of outstanding orders for advertisements shown in FIG. 8. As an example, if 1000 outstanding orders exist for Ad 1, and only 50 outstanding orders exist for Ad 2, the advertising control program would likely choose Ad 1 to preload and display. Outstanding order information typically is communicated to the host server through the Internet 410.

At step 670, the data selection program selects the appropriate data from among the preferenced data and the advertising data to preload to the browsing device. The data selection program takes into account the relative need to display advertising, as determined by the advertising control program, and the timeliness of the preferenced data, among other possible factors. Typically, the data selection program mathematically expresses the timeliness of the preferenced data and the need to present advertisements, and performs a comparison according to a predefined criteria to select the data to be preloaded. While either advertising data or preferenced data typically is selected for preloading, any combination of advertising data and preferenced data may be selected.

As shown in steps 680 and 690, the host server then preloads the selected data onto the browsing device, which stores the selected data in memory or on a mass storage device such as a hard drive. After storing the data, the browsing device then detects a second period of idle time, as shown at step 700, the method for detecting the second period of idle time having been described heretofore. Upon detection of the second period of idle time, the browsing device displays a transition page, as shown at 710, and presents the selected data within the transition page, as shown at 720. The data, in its presented form, typically contains hypertext links to additional, related information of interest to the user. Repetition of the method shown in FIG. 9 may enable the browsing device to sequentially display an advertisement and preferenced data on corresponding transition pages during successive download waiting periods.

Interlacing transition pages containing preferenced data among transition pages containing advertising data provides the user an interesting variety of transitions between web pages. Further, presenting a combination of advertising and preferenced data on a single transition page increases the user's interest in the transition. Thus, by such an integrated presentation of advertising data and preferenced data, advertising according to the present method simultaneously increases both user satisfaction and advertising effectiveness.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower, or equal in scope to the original claims.

What is claimed is:

1. In a networked computing environment including a plurality of browsing devices such as personal computers and client terminals, the client terminals having a conventional television monitor and an electronic unit that permits the television monitor to be used for receiving video and for receiving content from one or more web pages published on the network, and the browsing devices being interconnectable to a plurality of servers in order to permit content at web pages published at the servers to be browsed and downloaded as desired, and at least one of the servers serving as a host during a browsing session of at least one of the browsing devices, a method of displaying both i) preferenced data such as information on news, sports, weather or other topics of interest to a particular user, and ii) advertising data, without delaying the display of a particular web page that is to be downloaded to the particular user, comprising the following steps:

storing at the host server or at a browsing device of a particular user information that identifies preferenced data for the particular user;

storing at the host server instructions for selecting advertising content obtainable from one or more servers;

during a first browsing session at the browsing device of the particular user, identifying a particular web page that is to be downloaded, and thereafter detecting a first period of idle time, and then selecting either preferenced data or advertising data to be presented at the browsing device of the particular user;

preloading the selected preferenced data or advertising data to the browsing device of the particular user during the first period of idle time unless a specifically determined event occurs to signal interruption of the preloading; and during the same or a subsequent browsing session at the browsing device of the particular user, detecting a second period of idle time and creating at the browsing device of the particular user a transition page, and thereafter presenting at the transition page the preloaded preferenced data or advertising data unless a specifically determined event occurs to signal interruption of the displayed transition page so as not to delay or interfere with display of the particular web page that was identified for downloading.

2. In a networked computing environment including a plurality of browsing devices such as personal computers and client terminals, the client terminals having a conventional television monitor and an electronic unit that permits the television monitor to be used for receiving video and for receiving content from one or more web pages published on the network, and the browsing devices being interconnectable to a plurality of servers in order to permit content at web pages published at the servers to be browsed and downloaded as desired, and at least one of the servers serving as a host during a browsing session of at least one of the browsing devices, a computer program product for implementing a method of displaying both i) preferenced data such as information on news, sports, weather or other topics of interest to a particular user, and ii) advertising data, without delaying the display of a particular web page that is to be downloaded to the particular user, the computer program product comprising a computer readable medium for carrying executable instructions by which said method is implemented and wherein the method is comprised of the following steps:

storing at the host server or at a browsing device of a particular user information that identifies preferenced data for the particular user;

storing at the host server instructions for selecting advertising content obtainable from one or more servers in accordance with designated criteria;

during a first browsing session at the browsing device of the particular users, identifying a particular web page that is to be downloaded, and thereafter detecting a first period of idle time, and then alternately selecting either preferenced data or advertising data to be presented at the browsing device of the particular user;

preloading the selected preferenced data or advertising data to the browsing device of the particular user during the first period of idle time unless a specifically determined event occurs to signal interruption of the preloading; and during the same or a subsequent browsing session at the browsing device of the particular user, detecting a second period of idle time and creating at the browsing device of the particular user a transition page, and thereafter presenting at the transition page the preloaded preferenced data or advertising data unless a specifically determined event occurs to signal interruption of the displayed transition page so as not to delay or interfere with display of the particular web page that was identified for downloading.

3. In a networked computing environment including a plurality of browsing devices such as personal computers and client terminals, the client terminals having a conventional television monitor and an electronic unit that permits the television monitor to be used for receiving video and for receiving content from one or more web pages published on the network, and the browsing devices being interconnectable to a plurality of servers in order to permit content at web pages published at the servers to be browsed and downloaded as desired, and at least one of the servers serving as a host during a browsing session of at least one of the browsing devices, a method of displaying both i) preferenced data such as information on news, sports, weather or other topics of interest to a particular user, and ii) advertising data, without delaying the display of a particular web page that is to be downloaded to the particular user, comprising the following steps:

storing at the host server or at a browsing device of a particular user information that identifies preferenced data for the particular user;

storing at the host server instructions for selecting advertising content obtainable from one or more servers;

during a first browsing session at the browsing device of the particular user, identifying a particular web page that is to be downloaded, and thereafter detecting a first period of idle time, and then selecting either preferenced data or advertising data to be presented at the browsing device of the particular user;

preloading the selected preferenced data or advertising data to the browsing device of the particular user during the first period of idle time unless a specifically determined event occurs to signal interruption of the preloading, during the same or a subsequent browsing session at the browsing device of the particular user, detecting a second period of idle time and creating at the browsing device of the particular user a transition page; and controlling the flow of the selected preferenced data or advertising data by detecting whether a publisher shift has occurred, and if so, weighting as either heavy or light transition time to the newly selected publisher, and then also determining whether a minimum period of time has yet elapsed since a previous presentation of selected data, and only then thereafter presenting at the transition page the preloaded preferenced data or advertising data unless a specifically determined event occurs to signal interruption of the displayed transition page so as not to delay or interfere with display of the particular web page that was identified for downloading.

4. In a networked computing environment including a plurality of browsing devices such as personal computers and client terminals, the client terminals having a conventional television monitor and an electronic unit that permits the television monitor to be used for receiving video and for receiving content from one or more web pages published on the network, and the browsing devices being interconnectable to a plurality of servers in order to permit content at web pages published at the servers to be browsed and downloaded as desired, and at least one of the servers serving as a host during a browsing session of at least one of the browsing devices, a computer program product for implementing a method of displaying both i) preferenced data such as information on news, sports, weather or other topics of interest to a particular user, and ii) advertising data, without delaying the display of a particular web page that is to be downloaded to the particular user, the computer program product comprising a computer readable medium for carrying executable instructions by which said method is implemented and wherein the method is comprised of the following steps:

storing at the host server or at a browsing device of a particular user information that identifies preferenced data for the particular user;

storing at the host server instructions for selecting advertising content obtainable from one or more servers;

during a first browsing session at the browsing device of the particular user, identifying a particular web page that is to be downloaded, and thereafter detecting a first period of idle time, and then selecting either preferenced data or advertising data to be presented at the browsing device of the particular user;

preloading the selected preferenced data or advertising data to the browsing device of the particular user during the first period of idle time unless a specifically determined event occurs to signal interruption of the preloading;

during the same or a subsequent browsing session at the browsing device of the particular user, detecting a second period of idle time and creating at the browsing device of the particular user a transition page; and controlling the flow of the selected preferenced data or advertising data by detecting whether a publisher shift has occurred, and if so, weighting as either heavy or light transition time to the newly selected publisher, and then also determining whether a minimum period of time has yet elapsed since a previous presentation of selected data, and only then thereafter presenting at the transition page the preloaded preferenced data or advertising data unless a specifically determined event occurs to signal interruption or the displayed transition page so as not to delay or interfere with display of the particular web page that was identified for downloading.

5. A method as recited in one of claims 1–4, wherein the method further comprises querying the particular user to identify at least a portion of the preferenced data.

6. The method as recited in one of claims 1–4, wherein the second period of idle time is a connect waiting period during which the browsing device attempts to connect to a remote server on the communications network.

7. The method of claim anyone of claims 1–4, wherein the second period of idle time is a download waiting period during which the browsing device has requested, but has not completed downloading, information from a remote server on the communications network.

8. The method as recited in one of claims 1–4, wherein the determined browsing device event is a user interaction with a graphical user interface of the browsing device.

9. The method of claim anyone of claims 1–4, wherein the determined browsing device event is an initiation of other network communications by the browser program.

10. The method of claim anyone of claims 1–4, wherein the determined browsing device event is completion of a download of a web page.

11. The method as recited in one of claims 1–4, wherein the first period of idle time is a period of temporary inactivity of the browsing device.

12. The method of claim 11, wherein the period of temporary inactivity is a period of graphical user interface inactivity.

13. The method of claim 11, wherein the period of temporary inactivity is a period of network communications inactivity of the browser program.

14. The method of claim 11, wherein the period of temporary inactivity is a stalled download period during which the browsing device is connected to, but not receiving information from, a remote server.

* * * * *